June 13, 1939.  C. L. FRY ET AL  2,162,614
DEVICE FOR STANDARDIZING THERMOMETERS AND OTHER
TEMPERATURE MEASURING INSTRUMENTS
Filed Dec. 20, 1937
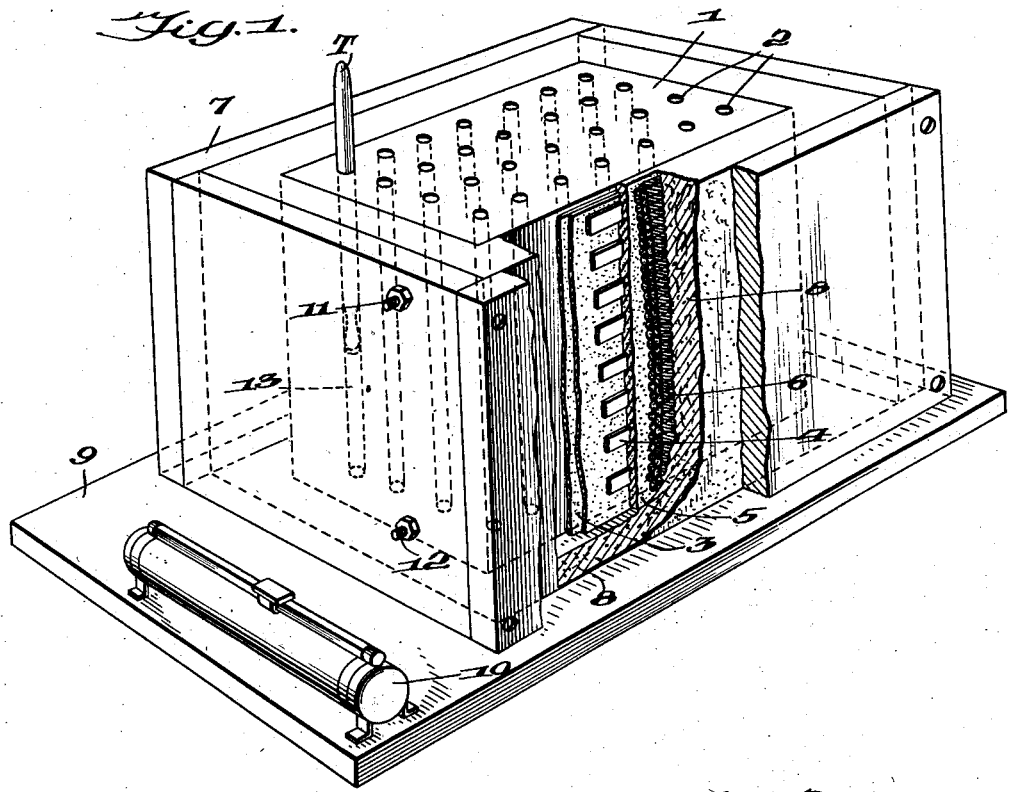
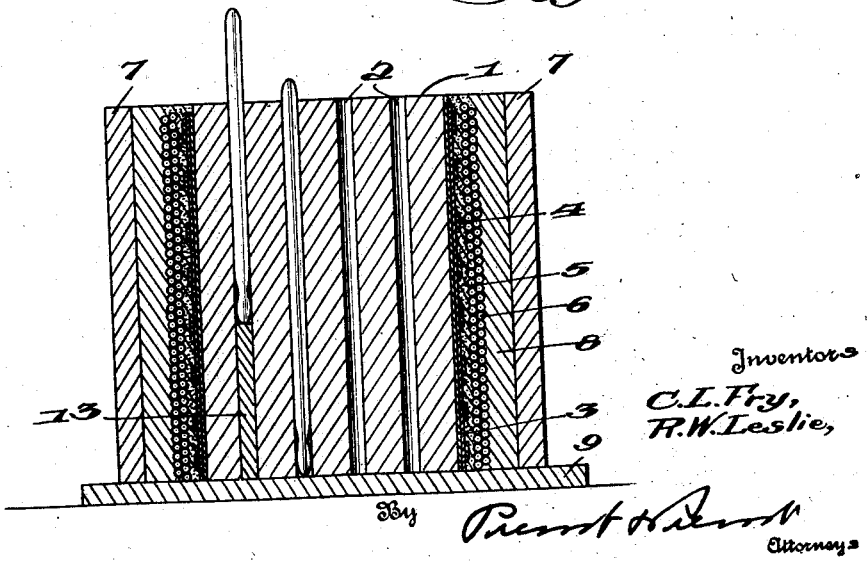
Inventors
C. L. Fry,
R. W. Leslie,
By
Attorneys Patented June 13, 1939

2,162,614

UNITED STATES PATENT OFFICE 2,162,614

DEVICE FOR STANDARDIZING THERMOMETERS AND OTHER TEMPERATURE MEASURING INSTRUMENTS

Clovis L. Fry and Robert W. Leslie, El Dorado, Kans., assignors to Skelly Oil Company, Tulsa, Okla.

Application December 20, 1937, Serial No. 180,900

2 Claims. (Cl. 73—151)

Our invention consists in new and useful improvements in a device for standardizing thermometers and other temperature measuring instruments, and has for its object to provide a device of this nature which is simple in construction and which represents a distinct improvement over apparatus and methods heretofore known.

It is essential in many industries and laboratories employing temperature measuring devices such as thermometers, thermocouples, resistance thermometers and the like to check and standardize such measuring devices by comparison with a standardized instrument whose readings have been calibrated with great care against the accepted standards, usually by the United States Bureau of Standards, so as to insure accurate readings. This comparison is commonly made by immersing the measuring instrument to be tested together with a standardized instrument in a common medium held at a uniform temperature.

One form of comparing medium frequently used is a well-stirred liquid bath but it has been found that such baths present a number of disadvantages. For example, they seldom maintain a uniform temperature throughout on account of convection currents induced by the application of heat at one point and heat losses at other points. Liquids are notoriously poor conductors of heat and furthermore they cannot be used to cover a wide range of temperatures because of limitations imposed by the freezing point and boiling point of the liquid employed.

It is therefore the primary object of our invention to provide a device for testing and standardizing thermometers or the like which definitely overcomes the disadvantages of the known types of device employing stirred baths.

It is known that metals, particularly copper and aluminum possess the property of rapid heat transmission through their mass, and heat applied to bodies of these metals at one point is very rapidly transmitted to all parts of the continuous piece. We have found that in this property, metals are far superior to liquids no matter how well stirred. It is therefore an object of our invention to make use of this property in a distinctly novel manner by employing a metal block as a comparing medium and embedding a standardized thermometer or other temperature measuring instrument therein, together with one or more instruments of unknown accuracy whose readings it is desired to calibrate.

With the above and other objects in view which will appear as the description proceeds, our invention consists in the novel features hereinafter set forth, illustrated in the accompanying drawing and more particularly pointed out in the appended claims.

Referring to the drawing in which numerals of like character designate similar parts throughout both views, Fig. 1 is a perspective view of one form of apparatus for carrying out our invention, said view being partly broken away to illustrate the construction of the device, and Fig. 2 is a transverse sectional view of the same.

In the drawing which, for the purpose of illustration, shows a form of apparatus designed for laboratory use in the checking of mercury in glass thermometers, 1 represents a solid block of metal, preferably copper or aluminum which may be of any convenient shape or size, depending upon the type of instrument to be calibrated, said block being drilled with a plurality of vertical holes 2 of the proper diameter and depth to receive the thermometers with a snug fit and at a depth of insertion for which calibration is desired. We have found by experimentation that a satisfactory depth for the holes 2 is about five inches. The holes may be spaced regularly throughout the block or irregularly as we have found that no important difference in temperature reading is discernible at any point in the block.

A layer of electrical insulating material 3 surrounds the block 1 on its lateral sides for the purpose of providing a non-conducting base upon which to wind the heating element hereinafter described. This insulating material may comprise asbestos paper covered with alundum cement or other suitable material. The heating element 4 consists preferably of strips of resistance ribbon or wire wound around the lateral sides of the block 1 on the non-conducting base 3.

In constructing the heating element for any given standardizing device, care should be taken to select a coil having electrical characteristics to suit the voltage available and the maximum temperature desired in the block 1. For example, our experiments have shown that for attaining temperatures upwards of 900 F. in the block 1, a continuous coil of chromel A ribbon of a width of $\frac{3}{16}$ inch and a thickness of .005 inch containing approximately eleven ohms resistance, is a satisfactory heating element where voltage of 110 to 120 is available. A heating element so constructed has an electrical capacity of about 1000 watts.

Returning to Fig. 1 of the drawing, surrounding the heating coil 4 is a layer of inert electrical insulating material 5, preferably composed of alundum cement or mica, having wound thereon one or more layers of asbestos rope 6. The unit thus insulated is packed in a suitable casing or container 7 with a substantial quantity of high grade high temperature insulating material 8 separating the unit from the casing 7. A suitable insulating material for this purpose may be rock wool which preferably extends not only around the lateral sides of the unit but across the bottom thereof.

The casing 7 may be constructed of transite board or other non-inflammable heat resistant material, and if desired, a cover (not shown) of the same construction may be applied, holes being provided in such cover to correspond with the holes 2 in the block 1 to permit insertion of thermometers into the block.

The insulated block 1 and casing 7 are preferably mounted on a suitable base 9 which also supports a rheostat 10 of conventional design, the heating element 4 being adapted for electrical connection in series with a source of electrical current and the rheostat 10 through the medium of binding posts 11 and 12 which extend through the wall of the casing 7. Although we have shown the rheostat 10 mounted on the base 9, it will be obvious that it may be placed at any convenient location where it will serve the purpose of controlling the heat applied to the block 1 so that comparisons of the thermometer readings may be made at any predetermined temperature.

In the operation of our device, a standardized thermometer T may be inserted in any one of the holes 2 and as many thermometers as desired may be tested at one time depending upon the number of holes available in the block 1. Where it is desired to test a thermometer with a length of insertion less than the predetermined depth of the holes 2, metallic rods 13 of the same composition as the block 1 may be inserted to raise the bottom of the hole to any desired degree.

After the thermometers have been arranged in the holes in the block 1, the resistance of rheostat 10 is adjusted to its maximum value and an electric current is applied to the rheostat coil. The degree of heating is then controlled by the rheostat 10 until the temperature is reached in the block 1 at which the comparisons are to be made.

Heat transmission throughout the block 1 is so rapid that all thermometers are similarly effected regardless of their position, and although readings may be taken as the temperature is rising, we have found that for accurate results, it is best to allow the block to assume a stationary temperature before making readings. Otherwise it is difficult for the eye to follow the readings simultaneously. This procedure requires but a few minutes at any setting of the rheostat. The tested thermometers are then calibrated in any suitable manner so as to standardize them with the thermometer of known accuracy.

As before stated, the device illustrated and described above is a type suitable for testing mercury in glass thermometers for laboratory use. It will be apparent, however, that by altering the size of the apparatus, the same general arrangement of the series of elements may be used for calibrating thermocouples, industrial thermometers, resistance thermometers, or any common temperature measuring or controlling mechanism.

From the foregoing it is believed that the construction and advantages of our invention may be readily understood by those skilled in the art without further description, it being borne in mind that numerous changes may be made in the details disclosed without departing from the spirit of our invention as set forth in the following claims.

What we claim and desire to secure by Letters Patent is:

1. A testing apparatus for temperature measuring instruments including a metal block provided with a plurality of wells adapted to receive temperature measuring instruments to be tested, a standardized temperature measuring instrument for indicating the temperature of said block, heating means surrounding said block, means for regulating said heating means, and a heat insulating casing for said block.

2. A self-contained testing apparatus for temperature measuring instruments including a base member, a metal block mounted on said base member, said block being provided with a plurality of wells adapted to receive temperature measuring instruments to be tested, a standardized temperature measuring instrument for indicating the temperature of said block, electrical heating means surrounding said block, means for regulating said heating means, a casing on said base member enclosing said block, and heat insulating means interposed between said block and said casing.

CLOVIS L. FRY.
ROBERT W. LESLIE.